Figure 1:
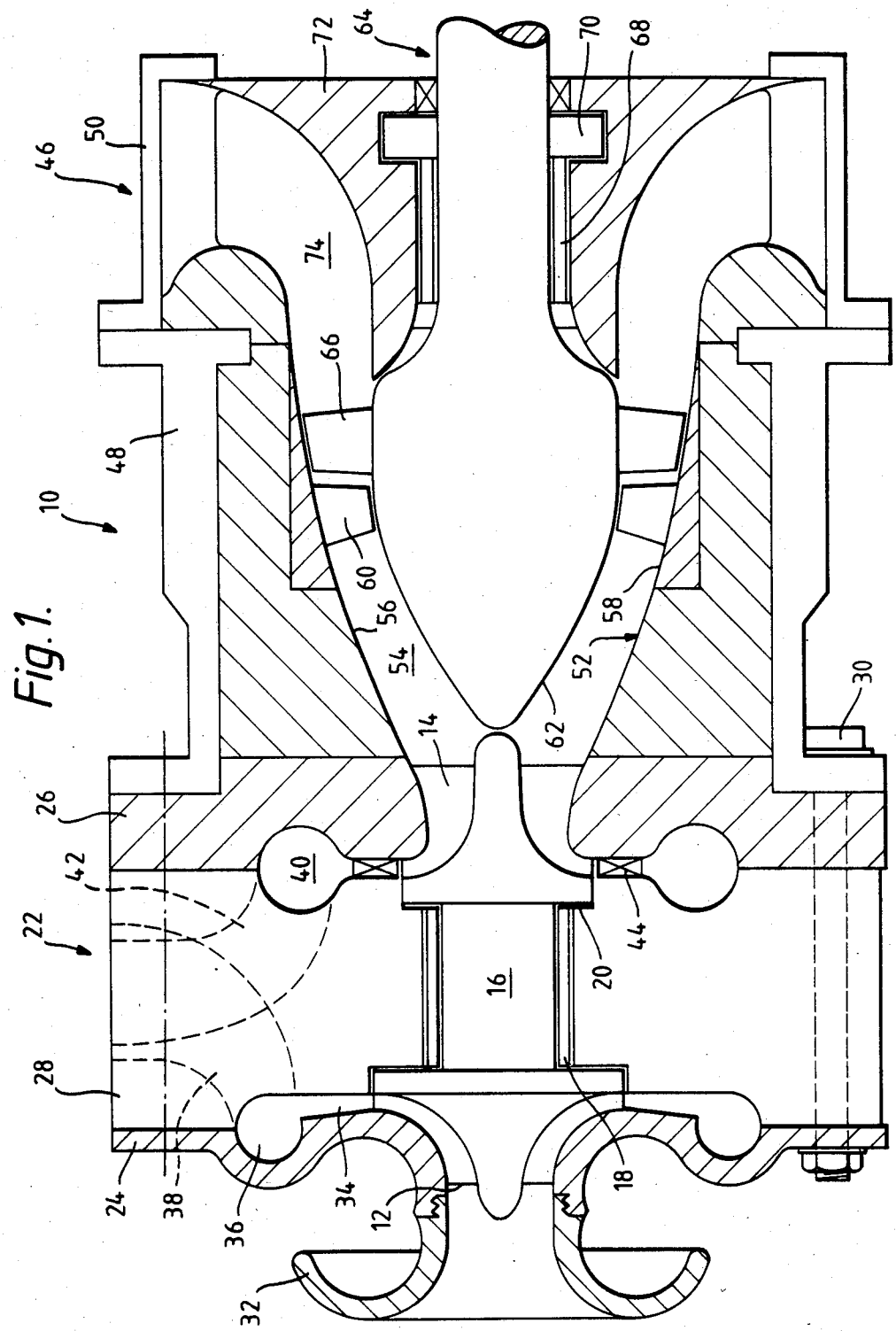

United States Patent [19]
Reynolds

[11] Patent Number: 4,598,542
[45] Date of Patent: Jul. 8, 1986

[54] GAS TURBINE POWER PLANT

[75] Inventor: Graham A. Reynolds, Coventry, England

[73] Assignee: Rolls-Royce Limited, London, England

[21] Appl. No.: 681,258

[22] Filed: Dec. 13, 1984

[30] Foreign Application Priority Data

Jan. 7, 1984 [GB] United Kingdom ............... 8400356

[51] Int. Cl.[4] ............................................. F02C 3/10
[52] U.S. Cl. ............................... 60/39.161; 60/39.75
[58] Field of Search ............ 60/39.161, 39.182, 39.35, 60/39.51, 39.75, 39.07; 415/143, 182; 237/12.1

[56] References Cited

U.S. PATENT DOCUMENTS

| | | | |
|---|---|---|---|
| 2,709,889 | 6/1955 | Mount | 60/39.35 |
| 2,709,893 | 6/1955 | Birmann | 60/39.511 |
| 2,821,067 | 1/1958 | Hill | 60/39.161 |
| 2,946,192 | 7/1960 | Hambling | 60/39.511 |
| 3,422,800 | 1/1969 | Haye | 60/39.182 |
| 3,751,886 | 8/1973 | Sokolowski | 60/39.182 |

FOREIGN PATENT DOCUMENTS

| | | | |
|---|---|---|---|
| 2511821 | 9/1975 | Fed. Rep. of Germany ... | 60/39.161 |
| 552072 | 11/1956 | Italy | 60/39.161 |
| 723368 | 2/1955 | United Kingdom | 60/39.161 |

Primary Examiner—Louis J. Casaregola
Attorney, Agent, or Firm—Cushman, Darby & Cushman

[57] ABSTRACT

A gas turbine engine is of a size suitable for generating electrical and heat energy for domestic and other purposes. The engine has a low number of components, and some of the components are capable of performing more than one function. For example, the engine has a centrifugal compressor driven by a centripetal turbine through a shaft. The compressor and turbine are mounted in a casing comprising a two part core and two end plates. The gas flow ducting is formed by surfaces on the compressor and turbine rotors, the core and the two end plates.

5 Claims, 4 Drawing Figures

GAS TURBINE POWER PLANT

This invention relates to a gas turbine power plant and is particularly though not exclusively concerned with a relatively small power plant driven by a gas turbine engine, producing electrical energy and energy for heating, refrigeration and air conditioning. Such a power plant would be useful for domestic purposes, small businesses and factories.

In order for the power plant to be competitive with existing systems of domestic energy supply the gas turbine engine as well as the other components of the power plant have to be relatively low in cost. The engine should thus be simple in design and have as small a number of parts as possible which are all capable of being produced by mass production methods.

It is an object of the present invention to provide a gas turbine engine having a small number of components which can be mass produced, the engine being reliable and capable of operation over long periods without the need of maintenance.

It is a further object of the invention to provide a power plant suitable for domestic or small business purposes incorporating a gas turbine engine, the power from which can be used to generate electricity, and the exhaust used for water heating, room heating, air conditioning and/or refrigeration.

Accordingly the present invention provides a gas turbine engine comprising a centrifugal compressor driven by a centripetal turbine, a single counterflow combustion chamber arranged to receive a flow of compressed air from the centrifugal compressor and a flow of fuel, and to discharge the products of combustion to the centripetal turbine, a relatively high inertial mass power turbine arranged to drive a load such as an a.c. generator, the power turbine comprising a row of stator vanes mounted in a casing, a wall of the casing partially defining a diffusion duct into which the exhaust from the centripetal turbine is discharged, the other wall of the diffusion duct being defined by a central body of the power turbine, the central body carrying a row of rotor blades located axially downstream of the stator vanes. The compressor and turbine can be mounted in a casing comprising upstream and downstream end plates between which is sandwiched a central core.

The compressor casing can be at least partially defined by a surface of the upstream end plate, and the compressor exhaust volute can be defined between the upstream end plate and the central core. In a preferred arrangement the compressor exhaust volute can be formed by surfaces on both the upstream plate and the central core. The turbine inlet volute can be formed by surfaces on the central core and the downstream end plate. The centripetal turbine housing can be formed by a surface on the downstream end plate.

The central core preferably contains ducting from the compressor and to the turbine which terminates in a central duct and a co-axial, annular duct.

The casing component can be secured together by any suitable means, e.g. bolts or by a flanged, split ring.

An attachment spigot for the combustion chamber can be attached to the casing aligned with the termination of the ducting. The casing preferably has a detachable intake flare, and the compressor and turbine can be attached to a common shaft journalled in a gas bearing. A gas thrust bearing can also be provided.

The stator vane casing can be attached to the turbocompressor casing by a housing which also acts as a containment ring. The stator vanes can be attached to a ring separate from the stator vane casing, which ring can be located in a recess in the stator vane casing.

The power turbine can be mounted in gas journal and thrust bearings in an exhaust volute casing attached to the containment ring of the power turbine.

According to the present invention there is also provided a domestic energy supply comprising a gas turbine engine as outlined above, a variable frequency wide voltage regulated a.c. generator driven by the power turbine of the engine, a boiler and/or an absorption system driven by the exhaust heat of the engine, and a control system to control the gas turbine, the electricity generated and the boiler and/or the absorption system, and to balance the energy from the electrical power output and the heat energy output.

Figure 2:
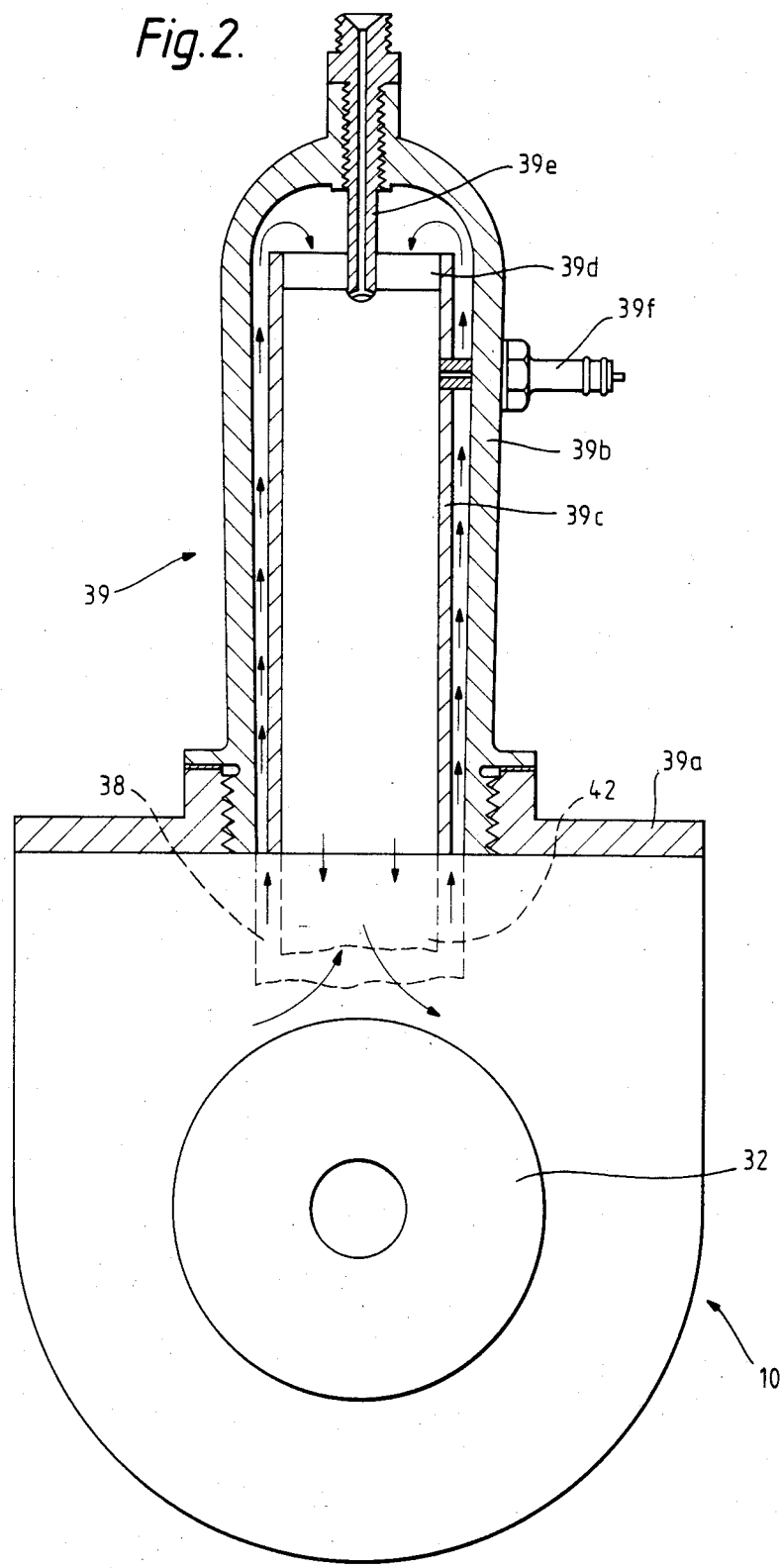
Figure 3:
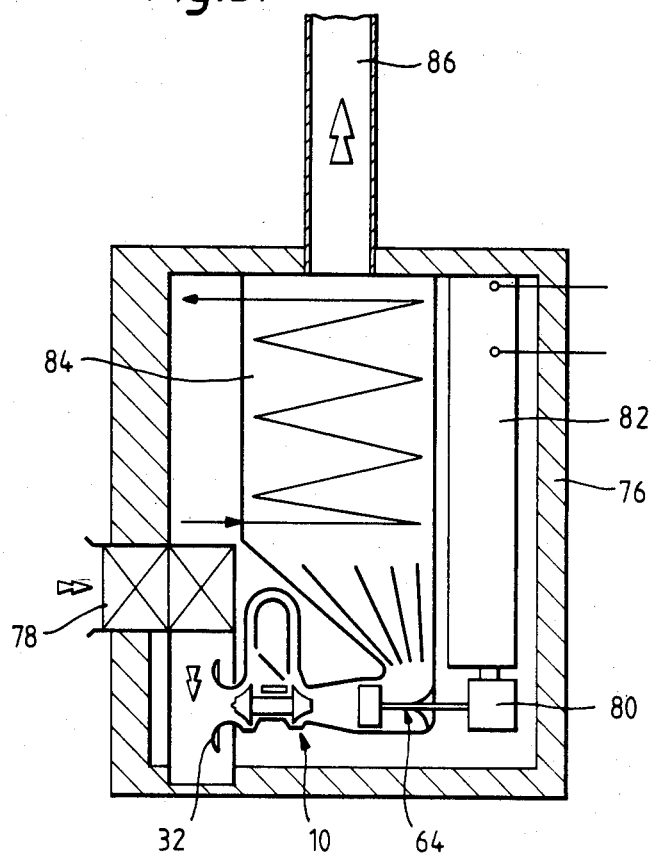
Figure 4:
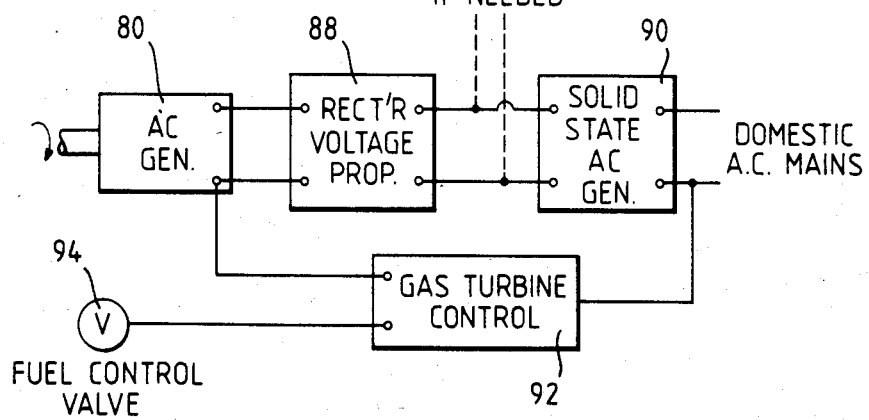

The present invention will now be more particularly described with reference to the accompanying drawings in which:

FIG. 1 shows a sectional elevation of one form of gas turbine engine according to the present invention, FIG. 2 is a view on arrow A in FIG. 1, including the engine combustion system in section, FIG. 3 shows in diagrammatic form a power plant incorporating a gas turbine of the type shown in FIG. 1, and FIG. 4 is a notional layout of the electrical supply and control of the power plant.

Referring to FIG. 1, a gas turbine engine 10 comprises a centrifugal compressor 12 driven by a centripetal turbine 14 via a shaft 16 to which the compressor and turbine are both attached. The shaft 16 is journalled in a gas bearing 18 and the rotor assembly of shaft, compressor and turbine also has a gas thrust bearing 20.

The rotor assembly is mounted in a housing 22 which comprises upstream and downstream end plates 24,26 respectively and a split central core 28 clamped between the end plates by suitable securing means, e.g. nut and bolt arrangements 30.

The upstream end plate 24 has an intake flare 32 attached to it and the inside surface of the end plate is shaped to provide the housing of the compressor 12 and partially defines the compressor outlet 34 and exhaust volute 36. The central core has a surface which in conjunction with the corresponding surfaces of the end plate defines the compressor outlet and exhaust volute.

A duct 38 is formed in the central core and connects the exhaust volute 36 with a side mounted combustion chamber 39 (FIG. 2).

In a similar manner the end plate 26 and the downstream face of the central core are shaped to define a turbine inlet volute 40 which is connected to the outlet from the combustion chamber by a duct 42 in the central core. The outlets of the ducts 38 and 42 are concentric and are attached to the combustion chamber by a suitable flanged connector 39a.

The combustion chamber 39 which is screwed to the connector 39a, has outer and inner casings 39b and 39c respectively. The inner casing has an upstream air swirler 39d, and a fuel injector 39e is mounted on the outer casing and extends through the centre of the air swirler. In this instance the fuel injector as for gas fuel, but a liquid fuel or a dual fuel injector can be provided. An igniter 39f is also mounted on the outer casing, and extends through the wall of the inner casing. The inner and outer casings define an annular space 39g which receives compressed air from the duct 38. The products of combustion are discharged from the inner casing to the duct 42.

Downstream of the volute 40 and between the central core and the end plate 26 is mounted a ring of nozzle guide vanes 44 to direct the hot, high velocity gases from the combustion chamber into the turbine 14.

As well as securing the components of the rotor assembly 22 together, the securing means 30 also attach a power turbine module 46 to the rotor assembly.

The module 46 comprises two casings 48,50 which locate and retain in position the components of the module, and which are secured together by suitable clamping means (not shown). Inside the casing 48, there is located a diffuser housing 52, the internal surface of which defines the outer surface of an annular diffuser 54. The housing 52 is formed from two components, a diffuser block 56 and a ring 58 to which is attached a row of inlet guide vanes 60. The other surface defining the diffuser duct 54 is defined by the external surface of the bullet 62 of a power turbine rotor 64 on which are mounted turbine blades 66.

The power turbine rotor 64 is mounted in a gas journal bearing 68 and has a gas thrust bearing 70. Both of these bearings are located in a bearing support structure 72 contained within and held in position by the casing 50.

The exhaust gases from the power turbine pass into an exhaust duct 74 which terminates in a volute (not shown) to conduct the exhaust to atmosphere through a suitable opening (not shown) in the casing 50. The exhaust duct 74 is defined partly by the ring 58 and partly by surfaces formed on the bearing support structure 72.

The compressor, compressor driving turbine, power turbine and associated guide vanes can be made from a ceramic material, e.g. silicon nitride, or from a good quality alloy depending on the nature of the fuel used. Other components which can be made from a ceramic material are the split casing 28, the end plate 26 and the power turbine stator ring and turbine casing 58. The remaining components, particularly the containment casing 48 can be formed from steel, or a suitable metal alloy.

It will be noted that the gas turbine is made from a very small number of components which can be easily assembled either by hand or by machine.

A particular feature of the design is the multi-function capability of some of the components. For example, the bullet 62 of the power turbine also partially defines the annular diffuser duct 54, and since it will rotate at high speed will induct a whirl velocity into the gases from the turbine 14. This feature can be used to aerodynamic advantage in the design of the power turbine and the inlet guide vanes 60. Also, the casing 48 as well as locating and retaining the diffuser duct components also acts as a containment for the power turbine in the case of turbine overspeed.

Referring to FIG. 3, the gas turbine engine 10 is shown located in a silenced cabinet 76 having an intake filter and silencer 78. The power turbine 64 drives a variable frequency wide voltage regulated a.c. generator 80, the output from which passes to a control and distribution system 82, shown in more detail in FIG. 3. The exhaust from the gas turbine passes into a boiler and/or absorption system 84, and exhausts to atmosphere through a stack 86 which can be silenced.

Referring to FIG. 4, the output from the a.c. generator 80 passes to a rectifier and voltage regulator 88 and hence to the domestic mains via a solid state a.c. generator 90. A tapping can be taken to charge batteries if required. A gas turbine control 92 is powered from the mains supply and receives signals inter alia from the a.c. generator to control the fuel supply to the engine by a valve 94.

I claim:
1. A gas turbine engine comprising;
 a compressor-turbine housing formed of a ceramic material;
 a compressor positioned at one end of said housing;
 a turbine positioned at the opposite end of said housing from said compressor;
 a shaft interconnecting said compressor to said turbine, said shaft being journaled in said housing in a gas bearing;
 a combustion arrangement secured to said housing for receiving compressed air from said compressor and a flow of fuel, said combustion arrangement discharging the products of combustion to said turbine through said housing;
 a diffuser housing connected to said compressor-turbine housing for defining the outer surface of an annular diffuser; said outer surface including a plurality of guide vanes;
 a bullet defining the inner surface of said annular diffuser, a plurality of turbine blades positioned on said bullet downstream of said guide vanes to thereby form a power turbine, said products of combustion from said turbine flowing into said diffuser and through said power turbine to thereby impart rotational energy to said bullet;
 and means for converting the rotational energy of said power turbine to work.

2. The gas turbine engine of claim 1 wherein said bullet of said power turbine is journaled to said diffuser housing by a gas bearing.

3. The gas turbine engine of claim 1 wherein said turbine in said compressor-turbine housing is supported therein by a gas thrust bearing.

4. The gas turbine engine of claim 1 further comprising a heat exchanger, and means for directing the discharge products passing through said power turbine past the heat exchanger.

5. The gas turbine engine of claim 1 wherein said turbine-compressor housing comprises a compressor exhaust volute integrally formed therein for directing the compressed air from said compressor to said combustion arrangement and said compressor-turbine housing comprising a turbine inlet volute for directing the products of combustion of said combustion arrangement to said turbine.

* * * * *